United States Patent
DiGiovanni et al.

(10) Patent No.: US 12,478,370 B2
(45) Date of Patent: Nov. 25, 2025

(54) DEVICES AND METHOD FOR FACILITATING PLACEMENT OF SUTURES IN A SURGICAL PROCEDURE

(71) Applicant: THE GENERAL HOSPITAL CORPORATION, Boston, MA (US)

(72) Inventors: Christopher W. DiGiovanni, Milton, MA (US); Rohan Bhimani, Bronx, NY (US); Gregory Waryasz, Milton, MA (US); Bart Lubberts, Cambridge, MA (US); Daniel Guss, Brookline, MA (US)

(73) Assignee: THE GENERAL HOSPITAL CORPORATION, Boston, MA (US)

( * ) Notice: Subject to any disclaimer, the term of this patent is extended or adjusted under 35 U.S.C. 154(b) by 325 days.

(21) Appl. No.: 18/015,015

(22) PCT Filed: Jul. 6, 2021

(86) PCT No.: PCT/US2021/040409
§ 371 (c)(1),
(2) Date: Jan. 6, 2023

(87) PCT Pub. No.: WO2022/010820
PCT Pub. Date: Jan. 13, 2022

(65) Prior Publication Data
US 2023/0255620 A1    Aug. 17, 2023

Related U.S. Application Data

(60) Provisional application No. 63/048,746, filed on Jul. 7, 2020.

(51) Int. Cl.
*A61B 17/04* (2006.01)
*A61B 17/28* (2006.01)

(52) U.S. Cl.
CPC .......... *A61B 17/0482* (2013.01); *A61B 17/28* (2013.01)

(58) Field of Classification Search
CPC ................ A61B 17/0482; A61B 17/28; A61B 2017/00455
(Continued)

(56) References Cited

U.S. PATENT DOCUMENTS 1,816,952 A * 8/1931 Bergman ............... A61B 17/04
606/139
3,921,641 A * 11/1975 Hulka .................... A61B 17/42
606/208
(Continued)

FOREIGN PATENT DOCUMENTS

CN    2850531 Y    12/2006

OTHER PUBLICATIONS

Mathieu Assal, M.D., Geneva University Hospital, Switzerland, Achillon, Minimal invasive Achilles tendon suture system, Surgical technique, newdeal New ideas for foot surgery, Integra Lifesciences Corporation, New Jersey, USA, 12 pages.

*Primary Examiner* — Julian W Woo
(74) *Attorney, Agent, or Firm* — Tarolli, Sundheim, Covell & Tummino LLP (57) ABSTRACT

A guiding apparatus, system, method, and forceps device for facilitating placement of sutures in a surgical procedure. The apparatus including a shaft portion having a non-circular aperture extending laterally therethrough and a blade portion having a shank extending at an angle from the shaft portion and a blade having a blade aperture extending from the shank. The system includes a plurality of the apparatuses held substantially parallel by an elongated rod through the
(Continued)

apertures of the shafts. The blade apertures guide the at least one suture to a desired location to pierce through a target body tissue.

11 Claims, 8 Drawing Sheets

(58) Field of Classification Search
USPC .................................................. 606/96, 205
See application file for complete search history.

(56) References Cited

U.S. PATENT DOCUMENTS

| | | | |
|---|---|---|---|
| 5,476,479 A * | 12/1995 | Green | A61B 17/2909 |
| | | | 606/205 |
| 5,509,922 A * | 4/1996 | Aranyi | A61B 17/29 |
| | | | 606/205 |
| 6,200,327 B1 | 3/2001 | Assal | |
| 6,547,797 B1 * | 4/2003 | Lee | A61B 17/326 |
| | | | 606/118 |
| D516,931 S * | 3/2006 | Collins | D10/6 |
| 7,404,821 B2 * | 7/2008 | Burbank | A61B 17/42 |
| | | | 606/205 |
| D578,648 S * | 10/2008 | Wood | D24/143 |
| 7,591,072 B2 * | 9/2009 | Stravitz | B26B 25/005 |
| | | | 30/304 |
| 7,842,050 B2 * | 11/2010 | Diduch | A61B 17/00234 |
| | | | 606/222 |
| 8,398,661 B2 | 3/2013 | Deland | |
| 2005/0192633 A1 | 9/2005 | Montpetit | |
| 2018/0036002 A1 | 2/2018 | Chen et al. | |

* cited by examiner

702 — POSITION THE BLADE PORTIONS OF AT LEAST A THIRD AND A FOURTH GUIDING APPARATUS ON OPPOSITE SIDES OF THE LENGTH OF THE TARGET BODY TISSUE OUTSIDE OF THE PERCUTANEOUS INCISION AND SUBSTANTIALLY PARALLEL WITH EACH OTHER AND THE FIRST AND SECOND GUIDING APPARATUSES

704 — PENETRATE THE ELONGATED ROD AT LEAST PARTIALLY THOUGH THE NON-CIRCULAR APERTURES OF THE AT LEAST THE THIRD AND FOURTH GUIDING APPARATUSES TO HOLD ALL OF THE GUIDING APPARATUSES IN A SPACED, SUBSTANTIALLY PARALLEL ORIENTATION RELATIVE TO EACH OTHER TO FORM A SURGICAL TOOL

706 — PIERCE THE AT LEAST ONE SUTURE THREAD THROUGH THE BLADE APERTURE OF THE THIRD GUIDING APPARATUS AND THE SKIN OF THE SUBJECT

708 — PIERCE THE AT LEAST ONE SUTURE THREAD THROUGH THE BLADE APERTURES OF THE FIRST AND SECOND GUIDING APPARATUS AND THE TARGET BODY TISSUE

710 — PIERCE THE AT LEAST ONE SUTURE THREAD THROUGH THE SKIN OF THE SUBJECT AND THE BLADE APERTURE OF THE FOURTH GUIDING APPARATUS

DEVICES AND METHOD FOR FACILITATING PLACEMENT OF SUTURES IN A SURGICAL PROCEDURE

RELATED APPLICATION

This application claims priority from U.S. Provisional Application No. 63/048,746, filed 7 Jul. 2020, the subject matter of which is incorporated herein by reference in its entirety.

TECHNICAL FIELD

This disclosure relates to apparatuses, a system, and a method for facilitating placement of sutures during a surgical procedure and, more particularly, to using a guiding instrument or a forceps device for facilitating repair of an Achilles tendon.

BACKGROUND

Muscles and tendons, such as the Achilles tendon, can rupture due to overstretching and mechanical failure of the tendon. Achilles tendon ruptures are one of the most common tendon ruptures in adults with approximately 230,000 people in the United State alone suffering from an Achilles tendon rupture every year, 80% of which occur during a recreational sporting activity. Surgical repair is often pursued and can be performed through small incisions in the percutaneous tissue overlying the Achilles tendon using specialized instrumentation.

SUMMARY

In an aspect, a guiding apparatus is described. The guiding apparatus comprising an apparatus body having first and second body ends and the apparatus body including a shaft portion adjacent the first body end and a blade portion adjacent the second body end; the shaft portion of the apparatus body including a non-circular aperture extending laterally therethrough; and the blade portion of the apparatus body including a shank and a blade extending longitudinally from the shank to the second body end, wherein the shank of the blade portion extends at an angle, within the longitudinal-transverse plane, from the shaft portion, and the blade includes a blade aperture extending laterally therethrough framed by a rim in a longitudinal-transverse plane of the blade.

In another aspect, a system is described. The system comprising a plurality of the guiding apparatuses positioned substantially laterally parallel to each other with the blade apertures of each of the plurality of apparatuses substantially aligned with each other along the longitudinal and transverse directions; and an elongated rod including a rod body extending longitudinally between a first rod end and a second rod end, the rod body having a non-circular perimeter shape, wherein the elongated rod is configured to selectively penetrate at least partially though the non-circular apertures of the plurality of the guiding apparatuses to hold the plurality of the guiding apparatuses in a spaced, substantially parallel orientation relative to each other to form a surgical tool, wherein the surgical tool is configured to move the plurality of guiding apparatuses substantially concurrently with one another responsive to motion of the elongated rod.

In another aspect, a method is described. The method comprising incising a percutaneous incision adjacent to a target body tissue; positioning the blade portions of at least a first guiding apparatus and a second guiding apparatus at least partially through the percutaneous incision, wherein the blade portions of the at least the first and second guiding apparatuses are positioned substantially parallel to each other on opposite sides of a length of the target body tissue with at least a portion of a longitudinal-transverse plane of each of the blades substantially adjacent to the target body tissue; penetrating an elongated rod at least partially through the non-circular apertures of the at least the first and second guiding apparatuses to hold the at least the first and second guiding apparatuses in a spaced, substantially parallel orientation relative to each other, wherein the elongated rod includes a rod body extending longitudinally between a first rod end and a second rod end, the rod body having a non-circular perimeter shape; and piercing at least one suture thread through the blade aperture of the at least the first guiding apparatus, through a target body tissue, and through the blade aperture of the at least the second guiding apparatus, wherein the at least the first and second guiding apparatuses indicate desired locations for the at least one suture thread to enter and exit the target body tissue.

In another aspect, a forceps device is described. The forceps device comprising a body having first and second body ends, the body including two arms connected via a hinge joint, each arm having a shaft portion adjacent the first body end and a blade portion adjacent the second body end, the first and second body ends being longitudinally separated by the hinge joint, wherein: the shaft portions of the arms each including a finger ring at the first body end and an elongated shaft that extends longitudinally to the hinge joint, and the blade portions of the arms each including a shank and a blade extending longitudinally from the shank to the second body end, wherein the shank of each of the arms extends at an angle, within the longitudinal-transverse plane, from the hinge joint, and the blade of each of the arms includes a blade aperture extending laterally therethrough framed by a rim in the longitudinal-transverse place of the blade, wherein the blades move laterally relative to one another in response to a lateral movement of the finger rings.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

As used herein, the term "subject" can be used interchangeably with the term "patient" and refer to any warm-blooded organism including, but not limited to, human beings, pigs, rats, mice, dogs, goats, sheep, horses, monkeys, apes, rabbits, cattle, farm animals, livestock, etc.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" and "between about X and Y" can be interpreted to include X and Y.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 1:
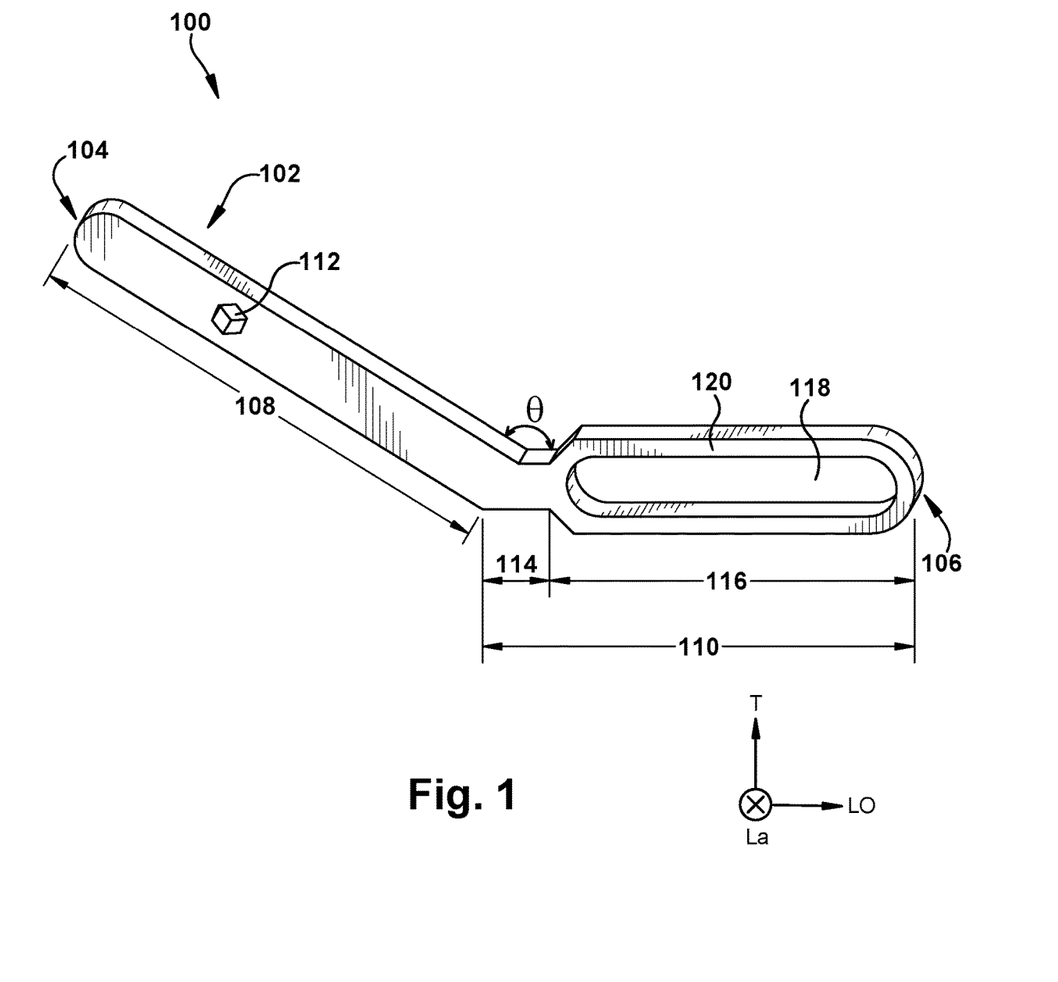
FIG. 1 is a perspective view of a guiding apparatus according to an aspect of the present disclosure.

FIG. 1 depicts a guiding apparatus 100 for facilitating a surgical procedure by guiding a suture thread to one or more desired locations in a target body tissue. The target body tissue can be, but is not limited to, an Achilles tendon. As such, the guiding apparatus 100 can be sized and dimensioned depending on its desired use. Example dimensions are listed throughout but should not be considered limiting. The guiding apparatus 100 has an apparatus body 102 having a first body end 104 and a second body end 106. The apparatus body 102 includes a shaft portion 108 adjacent to the first body end 104 and a blade portion 110 adjacent to the second body end 106. In one example, the shaft portion 108 can have a length between about ½-12 inches, 2-10 inches, or 3-7 inches. The shaft portion 108 of the apparatus body 102 includes a non-circular aperture 112 extending laterally therethrough the shaft portion. The lateral direction, as referenced herein, is substantially parallel to arrow "La", which extends into and out of the plane of the page in the orientation of FIG. 1. The non-circular aperture 108 can be any shape that does not allow for rotation of the guiding apparatus 100 around the non-circular aperture 112, such as, but not limited to, a hexagonal shape, a linear shape, a curvilinear shape, a polygonal shape, a rotationally asymmetric shape, or the like. By way of non-limiting example, the non-circular aperture 108 can be a hexagonal shape with widths from about 1-50 mm, 2-30 mm, or 5-15 mm. The non-circular aperture 112 can be a plurality of non-circular apertures positioned at any desired position in the shaft portion 108. When a plurality of non-circular apertures 112 is provided then one or more of the non-circular apertures may be configured to accept a non-circular rod therethrough (e.g., an additional non-circular rod). This may help to increase stability of the guiding apparatus 100 under force, in certain configurations. It is also contemplated that a rigid or flexible bracket or other suitable structure may be used to maintain desired (e.g., parallel) spacing of the guiding apparatuses 100 for a particular use environment.

The blade portion 110 of the apparatus body 102 includes a shank 114 and a blade 116 extending longitudinally from the shank to the second body end 106. The shank 114 connects the blade 116 and the shaft portion 108. In one example, the shank can be between about 0.01-6 inches, 0.1-4 inches, or ¼-3 inches in length. The shank 114 extends at an angle θ, within the longitudinal-transverse plane, from the shaft portion 108 to the blade 116. The angle θ, in the longitudinal-transverse plane, between the shaft portion 108 and the shank 114 can be between 0-360 degrees, 0-180 degrees, or 5-40 degrees. The angle θ can also be in another plane or offset from the longitudinal-transverse plane by another angle depending on the use of the guiding apparatus.

The blade 116 includes a blade aperture 118 that extends laterally through the blade and is framed by a rim 120. The rim 120 has a perimeter shape being in the longitudinal-transverse plane of the blade 116. The blade 116 may have a greater transverse dimension than the transverse dimension of the shank 114 and/or the shaft portion 108. As shown, the blade 116 has an oblong rounded rectangular shape in the longitudinal-transverse plane which has a larger transverse dimension than the shank 114 and the shaft portion 108. In another aspect, the transverse dimension of the blade 116 may be smaller than the transverse dimension of the shank 114 and/or the shaft portion 108. The shape of the blade 116 in the longitudinal-transverse plane can be any shape, such as a linear shape, an elliptical shape, a polygonal shape, a rotationally asymmetrical shape, or the like. The blade 116 and the blade aperture 118 can each have a substantially geometrically similar profile (e.g., have substantially similar perimeter shapes) when viewed from a direction within the longitudinal-transverse plane. In one example, the blade aperture 118 can have a length between about 1-12 inches, 1-10 inches, or 2-6 inches and a width between about 1-100 mm, 2-60 mm, or 5-40 mm.

In another aspect, the blade 116 and the blade aperture 118 can have different geometric profiles (e.g., the blade can have a square perimeter shape and the blade aperture can have a circular perimeter shape). The rim 120 can have any desired dimensions, depending on the size of the blade aperture 118. For example, the rim 120 can be a thin outline of the blade aperture 118 inside the blade 116, as shown, or can be a majority of the longitudinal-transverse face of the blade 116 if the blade aperture 118 is small. The blade aperture 118 can also be a plurality of blade apertures at any desired positions in the blade 116.

The apparatus body 102 can be a monolithic, single-piece, construct. The apparatus body 102 may be a substantially rigid material or a malleable material. Alternatively, the parts of the apparatus body 102 can be manufactured separately and attached together by an attachment means (not shown), such as welds, screws, hinges, adhesives, or the like. The attachment means can be, by way of nonlimiting example, between the shaft portion 108 and the blade portion 110. In one aspect, the attachment means can be a hinge that can be used to change the angle from which the shank 114 of the blade portion 116 extends from the shaft portion 108. The edges of all or part of the apparatus body 102 can be substantially smooth, such as having rounded or chamfered sides, to decrease the risk of cutting a portion of the target body tissue or another part of the subject's body with the guiding apparatus 100 during use. Additionally, the guiding apparatus 100, or any part thereof, can be a fluid resistant, biocompatible material that can be sterilized in a high-temperature dishwasher. Alternatively, or additionally, the guiding apparatus 100, or any part thereof, can be a disposable material.

Figure 2:
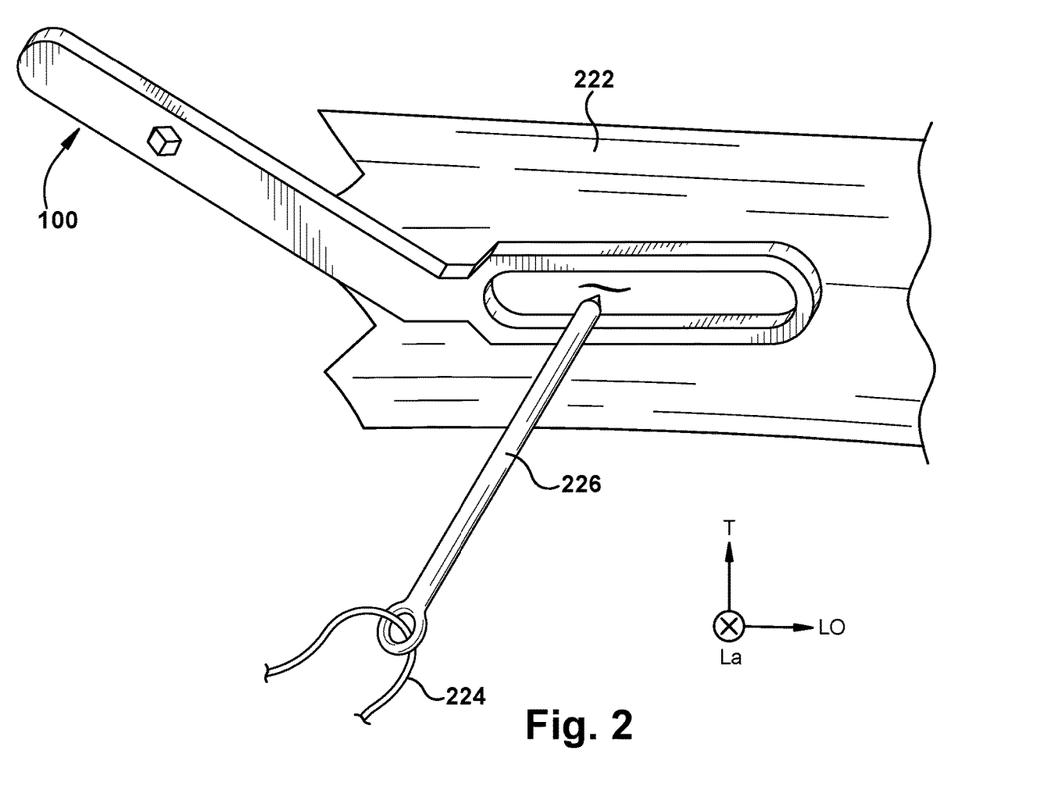
FIG. 2 depicts the guiding apparatus of FIG. 1 in an example use environment.

FIG. 2 depicts an exemplary use scenario where the guiding apparatus 100 is positioned laterally adjacent a target body tissue 222 for facilitating the placement of at least one suture thread 224 through the target body tissue. The blade aperture 118 is configured to accept the at least one suture thread 224 extending therethrough and into or out of the target body tissue 222. The blade aperture 118 is also configured to indicate a desired position for the suture thread 224 to pierce the target body tissue 222. The suture thread 224 can, for example, be attached to a needle 226 (such as a Keith needle) or to another sharp object capable of fitting through the blade aperture 118 and piercing through the target body tissue 222, where the target body tissue can be, for example, an Achilles tendon in need of repair.

Figure 3:
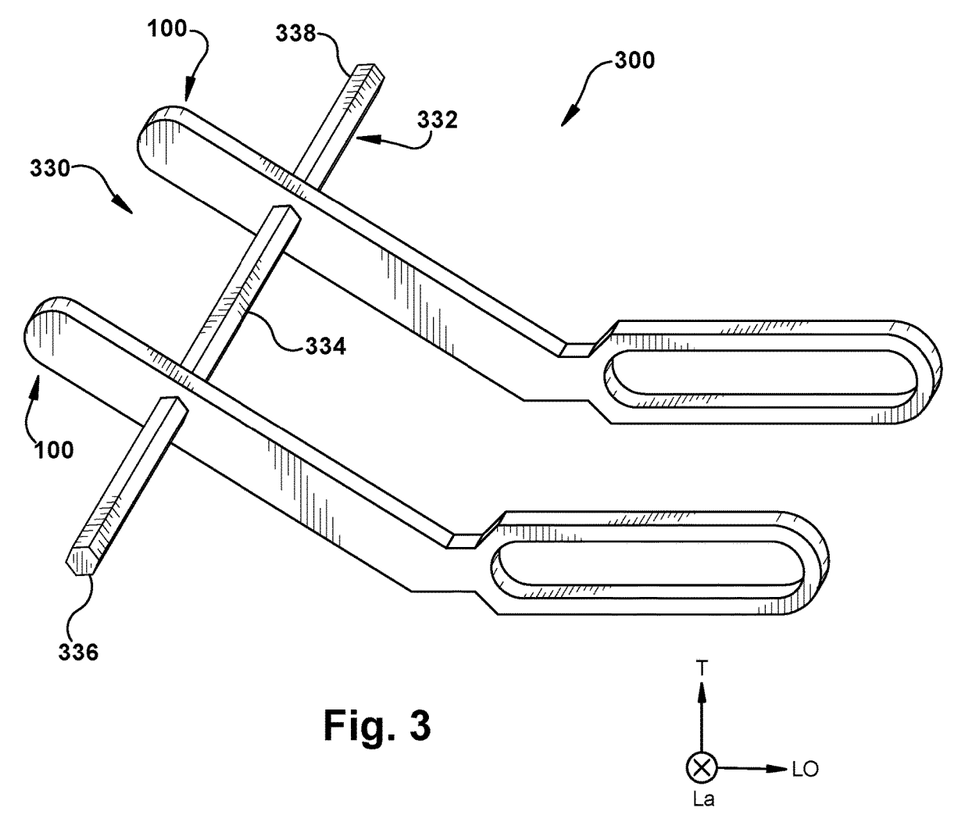
FIG. 3 is a perspective view of a surgical tool including a plurality of guiding apparatuses of FIG. 1.

FIG. 3 depicts a system 300 that makes up a surgical tool 330 for facilitating the repair of a target body tissue 222. The system 300 includes a plurality of the guiding apparatuses 100 positioned substantially laterally parallel to each other with the blade apertures 118 of each of the plurality of guiding apparatuses substantially aligned with each other along the longitudinal and transverse directions. Two guiding apparatuses 100 are shown in FIG. 3, however, it is understood that the system 300 can include any desired number of guiding apparatuses.

The system 300 also includes an elongated rod 332 that has a rod body 334 extending between a first rod end 336 and a second rod end 338. In one example, the elongated rod body 334 can have a length between about 1-12 inches, 2-10 inches, or 3-7 inches and widths between about 1-50 mm, 2-25 mm, or 5-15 mm. The rod body 334 has a non-circular perimeter shape that substantially matches at least a part of the shape of the non-circular apertures 112 of the plurality of guiding apparatuses 100 and is sized and dimensioned to fit into the non-circular apertures without being able to rotate relative thereto. The elongated rod 332 is configured to selectively penetrate at least partially through the non-circular apertures 112 of the plurality of guiding apparatuses and to hold the plurality of guiding apparatuses in a spaced, substantially parallel orientation relative to each other to form the surgical tool 330.

The surgical tool 330 is configured to move the plurality of guiding apparatuses 100 substantially concurrently with one another responsive to motion of the elongated rod 332. The elongated rod 332 can be moved, for example, by a user (such as a surgeon, physician, nurse, or the like) or by a stereotactic robot in order to position the plurality of guiding apparatuses 100 at a desired location on a target body tissue 222. The concurrent movement and substantially parallel positioning of the blade apertures 118 of the surgical tool 330 can facilitate improved precision and accuracy for guiding a surgical instrument (such as suture thread 224) into, through, and/or out of a target body tissue 222. The surgical tool 330 can be moved to a new location(s) and can hold, within the blade apertures 118, the end portions of the previous suture thread(s) as new sutures are placed in the target body tissue 222. When the desired number of sutures are pierced through the target body tissue 222 the surgical tool 330 can be pulled away from the target body tissue and the ends of the suture thread(s) held in one location for later use in the surgical repair procedure.

In another aspect, not shown, the elongated rod 332 can include a plurality of indentations along the length of the rod body 334, like the serrations on a zip tie. The indentations can be evenly spaced along the length of the rob body 334. The indentations can be on one or more of the sides of the rod body 334. The indentations can be configured with any sizes or dimensions that fit within the rod body 334. The indentations may all face in the same direction or the indentations may all face towards a middle point on the rod body 334, such that the indentations proximal to the first rod end 336 face the opposite direction of the indents proximal to the second rod end 338.

The indentations may also be holes that extend laterally through the elongated rod 332 or undulations or grooves around the body 334 of the elongated rod. In addition to the indented elongated rod 332, the plurality of guiding apparatuses 100 can also include a locking mechanism, such as a clip, claw, or ratchet, attached proximal to the non-circular aperture 112 for engaging the indentations (or holes, grooves, or undulations) to removably lock each of the guiding apparatuses in place on the elongated rod at desired distances from each other. A fixation device such as a washer, nut, or the like can be placed on (or screwed onto) the elongated rod 332 on either side of each of the plurality of guiding apparatuses 100 to fix the guiding apparatuses at desired distances from each other. The locking mechanisms and/or fixation devices can be moved, unlocked, or removed any number of times and the positions of the guiding apparatuses 100 on the elongated rod 332 can be changed as needed for one or more surgical procedures.

Figure 4:
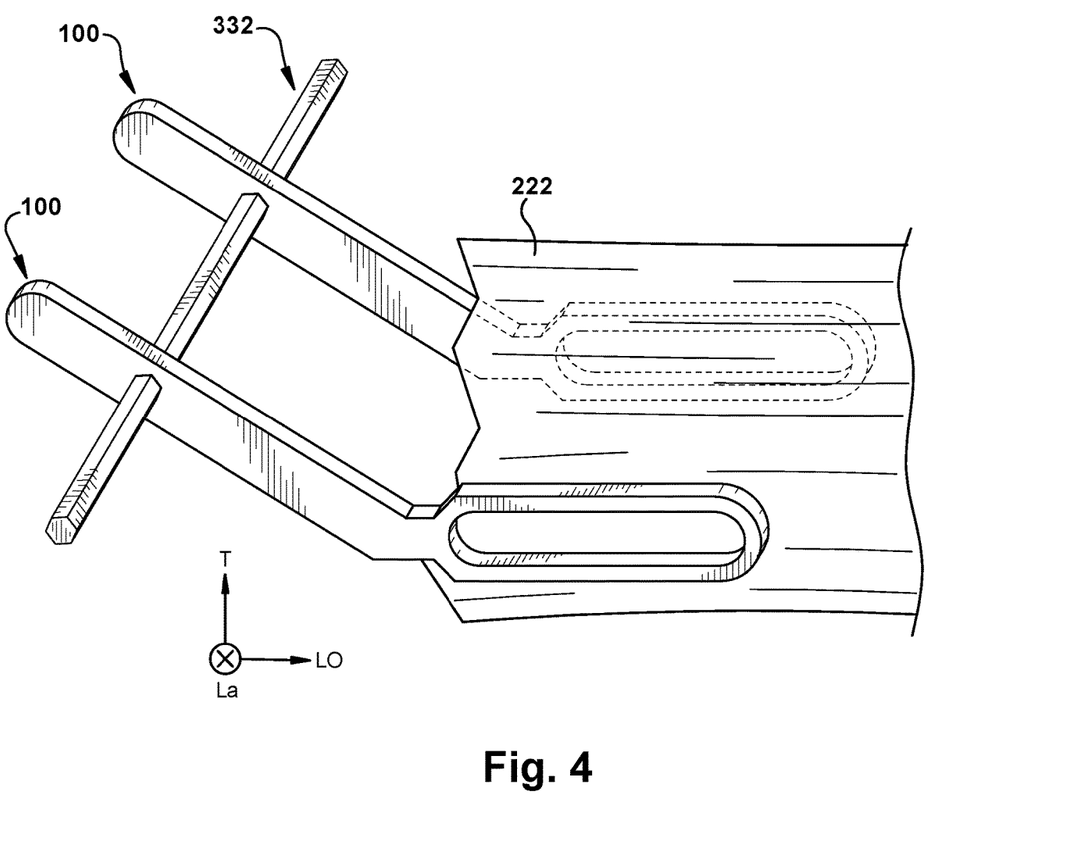
FIGS. 4 and 5 depict the surgical tool of FIG. 3 in an example use environment.

FIG. 4 depicts an exemplary use scenario where the surgical tool 330 inside the percutaneous tissue of a subject (not shown) where the surgical tool has at least two guiding apparatuses 100 attached to the elongated rod 332. The at least two guiding apparatuses 100 are positioned on laterally opposite sides of a length of a target body tissue 222 of a subject. The target body tissue 222 can be, for example, an Achilles tendon of the subject. At least one of the blade portions 110 of the at least two guiding apparatuses 100 can be selectively inserted at least partially through a percutaneous incision (neither skin nor incision shown) adjacent the target body tissue 222. Each of the shaft portions 108 of the at least two guiding apparatuses 100 extend substantially mutually parallel when the corresponding blade portions 110 are inserted at least partially through the percutaneous incision. Each of the blade apertures 118 of the at least two guiding apparatuses 100 can be configured (sized and dimensioned) to accept a suture thread (not shown) extending therethrough and to indicate a desired position on the target body tissue 222 for the suture thread 224 to be pierced through (e.g., using a needle).

In one aspect, the at least two guiding apparatuses 100 can be positioned at least partially through the percutaneous incision and adjacent opposite sides of the target body tissue 222 before the elongated rod 332 is penetrated at least partially through the non-circular apertures 112 in the shaft portions 108 of the guiding apparatuses and, optionally, locked into place. In another aspect, the at least two guiding apparatuses 100 can be positioned on the elongated bar 332 before insertion through the percutaneous incision and can be repositioned thereafter as needed.

Figure 5:
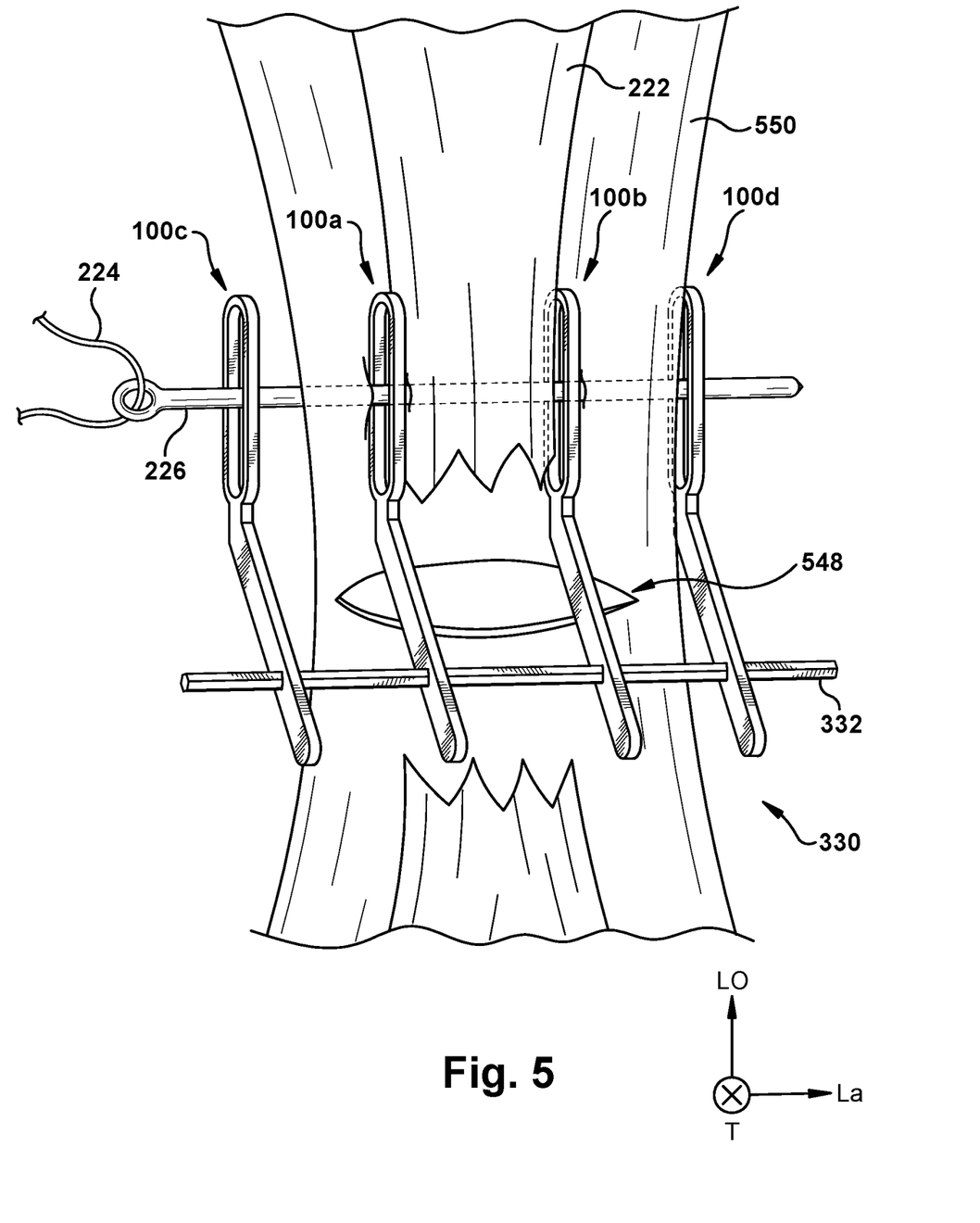

FIG. 5 depicts an exemplary use case where the surgical tool 330 including at least two laterally inner guiding apparatuses 100a, 100b and at least two laterally outer apparatuses 100c, 100d, where inner and outer refers to a position of the guiding apparatuses inside or outside a percutaneous incision 548 in a subject's skin 550. The at least two inner guiding apparatuses 100a, 100b can be inserted at least partially through the percutaneous incision 548 adjacent to a target body tissue 222 of the subject. The at least two inner guiding apparatuses 100a, 100b can be positioned on laterally opposite sides of a length of the target body tissue 222 with at least a portion of a longitudinal-transverse plane of each of the blades 116 substantially adjacent to the target body tissue. The at least two outer apparatuses 100c, 100d can be positioned outside the subject, with at least a skin surface 550 of the subject interposed laterally between each of the two outer apparatuses and at least one of the at least two inner apparatuses 100a, 100b. Each of the blade apertures 118 of the at least two inner apparatuses 100a, 100b are configured to accept a suture thread 224 extending therethrough and to indicate a desired position on the target body tissue 222 for piercing the target tissue with the suture thread. Each of the blade apertures of the at least two outer apparatuses 100c, 100d can also be configured to accept the suture thread extending therethrough and to indicate a desired position on the skin surface 550 of the subject for piercing the suture thread therethrough. The suture thread 224 may be pierced through only the at least two inner guiding apparatuses 100a, 100b and the target body tissue 222, or the suture thread may be pierced through the at least two outer guiding apparatus 100c, 100d and the skin surface 550 and/or through the at least two inner guiding apparatuses and the target body tissue. For example, when the target body tissue 222 is a ruptured Achilles tendon, the at least one suture thread 224 can sequentially pierce through any combination of: at least one of the at least two outer guiding apparatuses 100c, 100d, a portion of the skin surface 550, a portion of the paratenon, one of the at least two inner guiding apparatuses 100a, 100b, a portion of the Achilles tendon, at least another of the at least two inner guiding apparatuses, another portion of the paratenon, another portion of the skin surface, and another at least one of the at least two outer guiding apparatuses. The at least two inner guiding apparatuses 100a, 100b can be positioned between portions of the paratenon and the Achilles tendon such that when the at least two inner guiding apparatuses are pulled away from the surgical site the suture thread 224 remains only within the Achilles tendon. In one non-limiting example, the suture thread 224 is pierced through all of the above sequentially listed biological and apparatus layers. In another non-limiting example, the suture thread 224 is pierced through less than all of the above sequentially listed biological and apparatuses layers.

Another aspect of the present disclosure can include example methods 600 and 700 (shown in FIGS. 6 and 7) for using a surgical tool comprising a plurality of guiding apparatuses in combination with an elongated rod for facilitating surgical repair of a target body tissue (e.g., the surgical tool 330 shown in FIGS. 3-5). The methods 600 and 700 are illustrated as a process flow diagram with flowchart illustrations that can be implemented by one or more components of the surgical tool 330, as shown in FIGS. 3-5. For purposes of simplicity, the methods 600 and 700 are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods 600 and 700.

Figure 6:
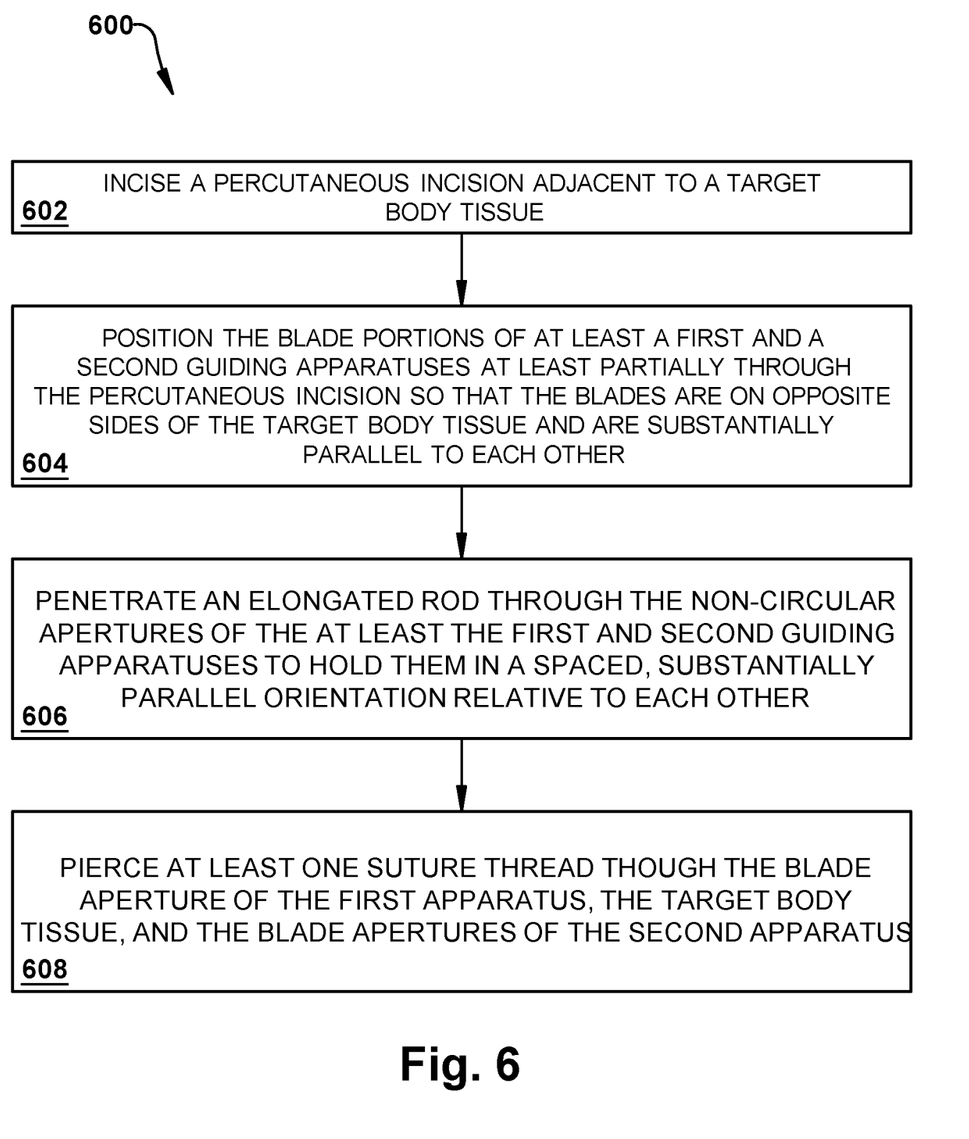
FIGS. 6 and 7 are process flow diagrams of methods of using the surgical tool of FIG. 3 according to aspects of the present disclosure.

FIG. 6 depicts method 600. At 602, a percutaneous incision is incised adjacent to a target body tissue. For example, the target body tissue can be a ruptured Achilles tendon and the percutaneous incision can be incised over the gap between the parts of the Achilles tendon. The percutaneous incision can be made in a sub-paratenon fashion but superficial to the Achilles tendon itself. At 604, the blade portions of at least a first guiding apparatus (like guiding apparatus 100 of FIGS. 1-5) and a second guiding apparatus are positioned at least partially through the percutaneous incision. The blade portions of the at least the first and second guiding apparatuses are positioned substantially parallel to each other on opposite sides of a length of the target body tissue with at least a portion of a longitudinal-transverse plane of each of the blades substantially adjacent to the target body tissue. As a non-limiting example, if the target body tissue is the Achilles tendon, then the blade portions of the first and second guiding apparatuses can be positioned on medial and lateral sides of the tendon such that the blade apertures are aligned substantially parallel to each other at a desired position along the length of the tendon fragment.

At 606, an elongated rod (such as elongated rod 332 of FIGS. 3-5) is penetrated at least partially though the non-circular apertures of the at least the first and second guiding apparatuses to hold the at least the first and second guiding apparatuses in a spaced, substantially parallel orientation relative to each other. The elongated rod can include a rod body extending between a first rod end and a second rod. The rod body can have a non-circular perimeter shape that substantially matches the shape of the non-circular apertures of the guiding apparatuses. The non-circular perimeter shapes can be any shapes that resist rotation of the guiding apparatuses around the elongated rod. The first and second guiding apparatuses can be positioned on the elongated rod before being positioned on opposite sides of the target body tissue. Alternatively, the guiding apparatuses can be positioned before the elongated rod is inserted through the non-circular apertures in the guiding apparatuses. The first and second guiding apparatuses may be removably locked into a position on the elongated rod using locking mechanism(s) or fixation device(s) (e.g., a ratchet, a clip, washers, indentations on the elongated rod, or the like.).

At 608, at least one suture thread is pierced through the blade aperture of the at least the first guiding apparatus, through the target body tissue, and through the blade apertures of the at least the second guiding apparatus. The first and second guiding apparatuses indicate desired positions for the at least one suture thread to enter and exit the target body tissue. The guiding apparatuses act improve the accuracy and precision of piercing the at least one suture thread through the target body tissue. After 608 the elongated rod can be moved, for example, by a user or a stereotactic robot, to move the at least the first and second guiding apparatuses substantially concurrently to new locations along the length of the target body tissue for additional suture threads to be pierced through the target body tissue at the new locations. The elongated rod can also be moved to pull the end portions of the at least one suture thread away from the target body tissue to be held out of the way for later use during the surgical procedure.

Figure 7:
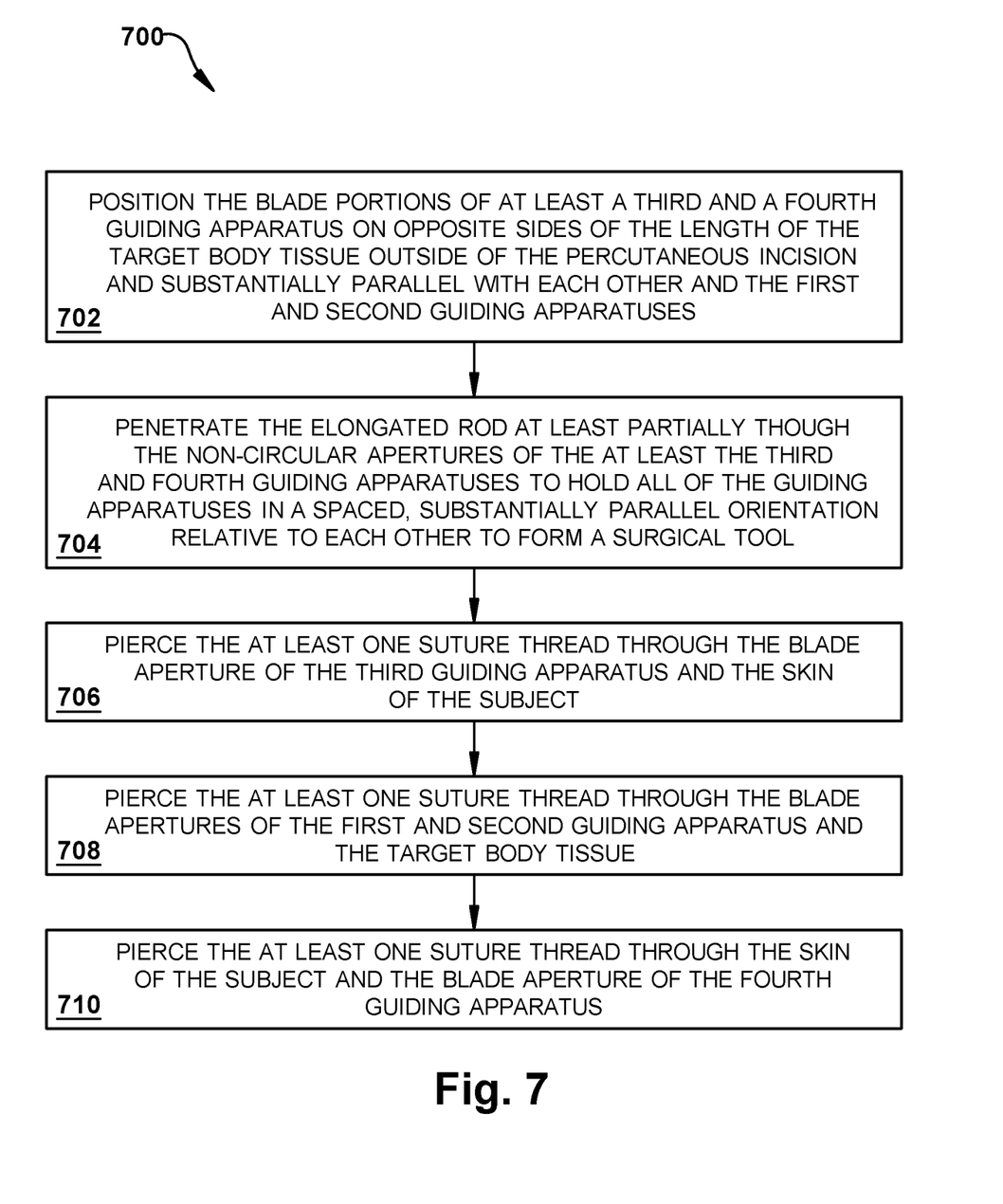

FIG. 7 depicts method 700, which can be used in conjunction with method 600. At 702, the blade portions of at least a third guiding apparatus and a fourth guiding apparatus are positioned on opposite sides of the length of the target body tissue outside of the percutaneous incision and substantially parallel with each other and the at least the first and second guiding apparatuses. At least a portion of a skin surface of the subject is interposed laterally therebetween (e.g., an order of: fourth apparatus, skin, second apparatus, target body tissue, first apparatus, skin, third apparatus). When the target body tissue is the ruptured Achilles tendon the at least the third and forth guiding apparatuses can be, for example, positioned on medial and lateral sides of the subject's calf.

At 704, the elongated rod is penetrated at least partially through the non-circular apertures of the at least the third and fourth apparatuses to hold the at least the first, second, third, and fourth apparatuses in a spaced, substantially parallel orientation relative to each other to form a surgical tool. The third and fourth guiding apparatuses can be positioned on the elongated rod as a means of positioning them in a desired location and orientation with the at least the first and second guiding apparatuses. In another aspect, at least the first through the fourth guiding apparatuses can all be positioned on the elongated rod prior to positioning the blade portions of the first and second guiding apparatuses through the percutaneous incision and can be moved along the rod body to be positioned as desired adjacent the target body tissue and or the skin surface of the subject.

At 706, the at least one suture thread is pierced through the blade aperture of the at least the third guiding apparatus and the skin of the subject. At 708, the at least one suture thread is pierced through the blade apertures of the at least the first and the second guiding apparatuses and the target body tissue therebetween. At 710, the at least one suture thread is then pierced through the skin of the subject and the blade aperture of the at least the fourth guiding apparatus. The at least one suture thread can also be pierced through other tissues of the subject not listed above, depending on the requirements of the surgical procedure being facilitated. Additionally, the suture thread may not pierce through one or more of the blade apertures described above, the skin, or the target body tissue as desired for the surgical procedure being facilitated.

Additionally, the elongated rod can be moved, such as by a user or a stereotactic robot, to move the at least the first through fourth guiding apparatuses substantially concurrently to new locations along the length of the target body tissue for additional suture threads to be pierced through the target body tissue at the new locations. The elongated rod can also be moved to pull the end portions of the at least one suture thread away from the target body tissue to be held out of the way, by the blade apertures, for later use during the surgical procedure.

Any of the above-described methods can be repeated as many times as needed depending on the surgical procedure being facilitated and/or the target body tissue. For example, if the target body tissue is an Achilles tendon ruptured into two pieces any or all steps of the methods can be done twice, once for each tendon piece.

Figure 8:
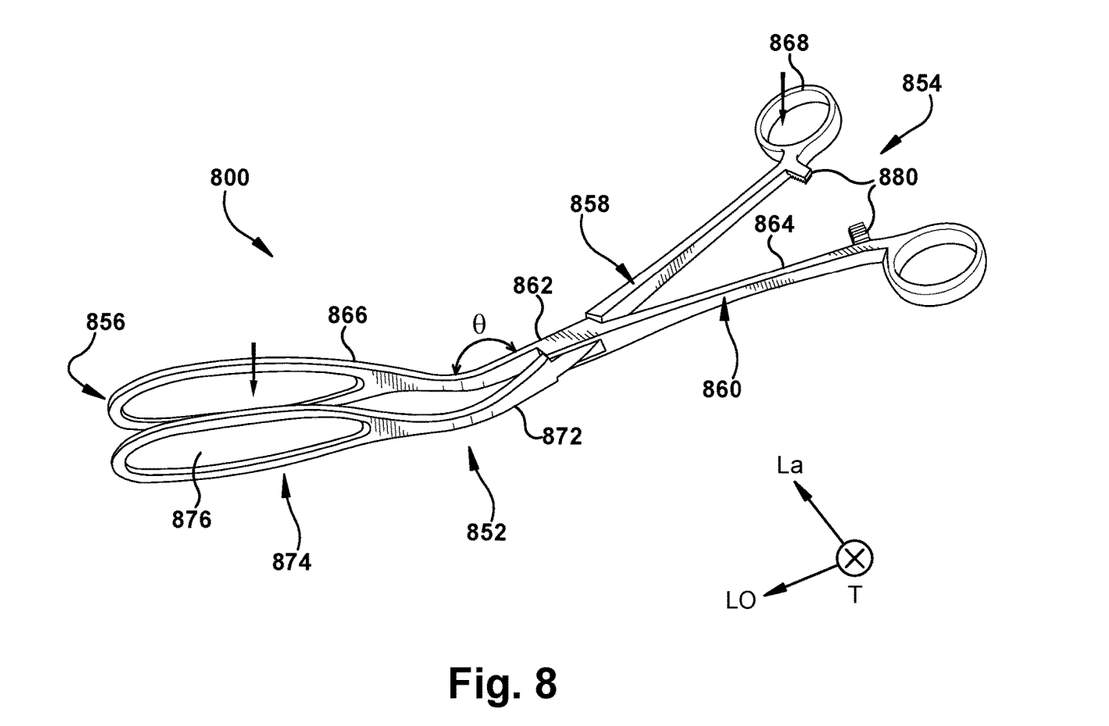
FIG. 8 is a perspective view of an aspect of a guiding apparatus according to the present disclosure.

FIG. 8 depicts a guiding apparatus in the form of a forceps device 800 for facilitating a surgical procedure of a target body tissue, such as repair of an Achilles tendon. The forceps device 800 includes a body 852 having a first body end 854 and a second body end 856. The forceps body 852 includes two arms 858, 860 connected via a hinge joint 862. Each arm 858, 860 has a shaft portion 864 adjacent the first body end 854 and a blade portion 866 adjacent the second body end 856. The first and second body ends 854, 856 are longitudinally separated by the hinge joint 862. The shaft portions 864 of the each of the arms 858, 860 each include a finger ring 868 at the first body end 856 and an elongated shaft body 870 that extends longitudinally to the hinge joint 862. The shaft portions 864 of each of the arms 858, 860 can also include a locking means 880 configured to maintain the arms in placed when the finger rings are moved laterally towards each other.

The blade portions 866 of the arms 858, 860 each include a shank 872 and a blade 874 extending longitudinally from the shank to the second body end 856. The shank 872 of each of the arms 858, 860 extends at an angle θ, within the longitudinal-transverse plane, from the hinge joint 862. The angle θ can be, for example between about 0-360 degrees, 0-180 degrees, or 5-40 degrees and the length of the shank 872 can be between about 0.01-10 inches, 0.1-6 inches, or ¼-3 inches. The blade 874 of each of the arms 858, 860 includes a blade aperture 876 extending laterally therethrough framed by a rim 878 in the longitudinal-transverse plane of the blade. The blades 874 move laterally relative to one another in response to a lateral movement of the finger rings 868. When the finger rings 868 are moved laterally in a manner that closes the forceps device 800 (e.g., causes the blades to be closer together) the blade portions 866 can have a slight convergent shape relative to one another. In an "open configuration", when the finger rings 868 are moved laterally away from each other, the blades portions 866 can be parallel to each other. The blades 874 also include at least one user perceptible marking (not shown), such as a tactile marking or a visual marking (visible with the visible light spectrum, IR light, UV light, etc.). The at least one user perceptible marking can indicate at least one location on the target body tissue for at least one suture to pierce through.

The blade apertures 876 of the arms 858, 860 can be positioned on opposite sides of a target body tissue (not shown) to hold the target body tissue in place. When the finger rings 868 are laterally moved to close the blades 874, the blades are removably fastened onto the target body tissue. The blade apertures 876 can be configured to accept at least one suture thread laterally therethrough so the at least one suture thread can pierce through the target body tissue (e.g., using a needle or other sharp object). The blade apertures 876 can be any shape or size that allows at least one suture thread laterally therethrough, such as an oblong elliptical shape. In one example, the blade apertures 876 can have a length between about 3-6 inches and widths ranging between 5-15 mm.

The forceps device 800 can be used to improve the precision and accuracy of suture placement in a surgical procedure. For example, the surgical procedure can be a repair of a ruptured Achilles tendon and the forceps device 800 can be closed on a selected part of a ruptured Achilles tendon so that at least one suture can be pierced through a desired location in the selected part of the ruptured Achilles tendon. The forceps device 800 can be moved and another at least one suture pierced through a second desired location. The forceps device 800 can then be pulled away from the target body tissue (e.g., the Achilles tendon) to pull end portions of the at least one suture thread, which extend through the blade apertures 876, away from the target body tissue and held out of a user's way until needed at another time during the surgical procedure. A plurality of forceps devices 800 can be used for different parts of a target tissue, or the same forceps device 800 can be moved to different parts of the target body tissue.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials; however, the chosen material(s) should be biocompatible for many applications. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A system comprising:
    a plurality of guiding apparatuses, each apparatus including
        an apparatus body having first and second body ends, the apparatus body including a shaft portion adjacent the first body end and a blade portion adjacent the second body end,
        the shaft portion of the apparatus body including a non-circular aperture extending laterally therethrough, and
        the blade portion of the apparatus body including a shank and a blade extending longitudinally from the shank to the second body end, wherein the shank of the blade portion extends at an angle, within the longitudinal-transverse plane, from the shaft portion, and the blade includes a blade aperture extending laterally therethrough framed by a rim in a longitudinal-transverse plane of the blade;
    the plurality of apparatuses being positioned substantially laterally parallel to each other, with the blade apertures of each of the plurality of apparatuses substantially aligned with each other along the longitudinal and transverse directions; and
    an elongated rod including a rod body extending between a first rod end and a second rod end, the rod body having a non-circular perimeter shape, wherein the elongated rod is configured to selectively penetrate at least partially through the non-circular apertures of the plurality of the apparatuses and to hold the plurality of the apparatuses in a spaced, substantially parallel orientation relative to each other to form a surgical tool, wherein the surgical tool is configured to move the plurality of apparatuses substantially concurrently with one another responsive to motion of the elongated rod.

2. The system of claim 1, wherein at least two of the apparatuses of claim 1 are configured to be positioned on laterally opposite sides of a length of a target body tissue of a subject.

3. The system of claim 2, wherein the target body tissue is an Achilles tendon.

4. The system of claim 2, wherein each of the blade portions of the at least two apparatuses are configured to be inserted at least partially through a percutaneous incision adjacent the target body tissue, wherein each of the shaft portions of the at least two apparatuses extend substantially mutually parallel when the corresponding blade portions are inserted at least partially through the percutaneous incision.

5. The system of claim 4, wherein each of the blade apertures of the at least two apparatuses are configured to accept a suture thread extending therethrough and indicate a desired position on the target body tissue for piercing the target tissue with the suture thread.

6. The system of claim 1, wherein the surgical tool includes at least two laterally inner apparatuses and at least two laterally outer apparatuses, wherein:
    the at least two inner apparatuses are configured to be inserted at least partially through a percutaneous incision adjacent to a target body tissue of a subject and to be positioned on laterally opposite sides of a length of the target body tissue with at least a portion of a longitudinal-transverse plane of each of the blades substantially adjacent to the target body tissue, and the at least two outer apparatuses are configured to be positioned outside the subject, with at least a skin surface of the subject interposed laterally between each of the two outer apparatuses and at least one of the at least two inner apparatuses.

7. The system of claim 6, wherein each of the blade apertures of the at least two inner apparatuses are configured to accept a suture thread extending therethrough and indicate a desired position on the target body tissue for piercing the target tissue with the suture thread and each of the blade apertures of the at least two outer apparatuses are configured to accept the suture thread extending therethrough and indicate a desired position on the skin surface of the subject for piercing the suture thread therethrough.

8. A method comprising:

incising a percutaneous incision adjacent to a target body tissue;

positioning the blade portions of at least a first apparatus and a second apparatus at least partially through the percutaneous incision, wherein the blade portions of the at least the first apparatus and the second apparatus are positioned substantially parallel to each other on opposite sides of a length of the target body tissue with at least a portion of a longitudinal-transverse plane of each of the blades substantially adjacent to the target body tissue;

penetrating an elongated rod at least partially through non-circular apertures of the at least the first and second apparatuses to hold the at least the first and second apparatuses in a spaced, substantially parallel orientation relative to each other, wherein the elongated rod includes a rod body extending between a first rod end and a second rod end, the rod body having a non-circular perimeter shape; and piercing at least one suture thread through the blade aperture of the at least the first apparatus, through the target body tissue, and through the blade aperture of the at least the second apparatus, wherein the at least the first and second apparatuses indicate desired positions for the at least one suture thread to enter and exit the target body tissue.

9. The method of claim 8, further comprising:

positioning the blade portions of at least a third apparatus and a fourth apparatus on opposite sides of the length of the target body tissue outside of the percutaneous incision and substantially parallel with each other and the at least the first and second apparatuses, with at least a portion of a skin surface of the subject is interposed laterally therebetween;

penetrating the elongated rod at least partially through the non-circular apertures of the at least the third and fourth apparatuses to hold the at least the first, second, third, and fourth apparatuses in a spaced, substantially parallel orientation relative to each other to form a surgical tool;

piercing the at least one suture thread through the blade aperture of the at least the third apparatus before piercing the at least one suture thread through the blade aperture of the at least the first apparatus; and piercing the at least one suture thread through the blade aperture of the at least the fourth apparatus after piercing the at least one suture thread through the blade aperture of the at least the second apparatus.

10. The method of claim 9, further comprising moving the elongate rod to move the at least first, second, third, and fourth apparatuses of claim 1 substantially concurrently away from the target body tissue, to pull ends of the at least one suture thread away from the target body tissue.

11. The method of claim 8, wherein the target body tissue is an Achilles tendon.

* * * * *